Aug. 5, 1941.  R. G. DREW  2,251,273
ADHESIVE SHEET AND METHOD OF MAKING THE SAME
Filed March 9, 1933  2 Sheets-Sheet 1
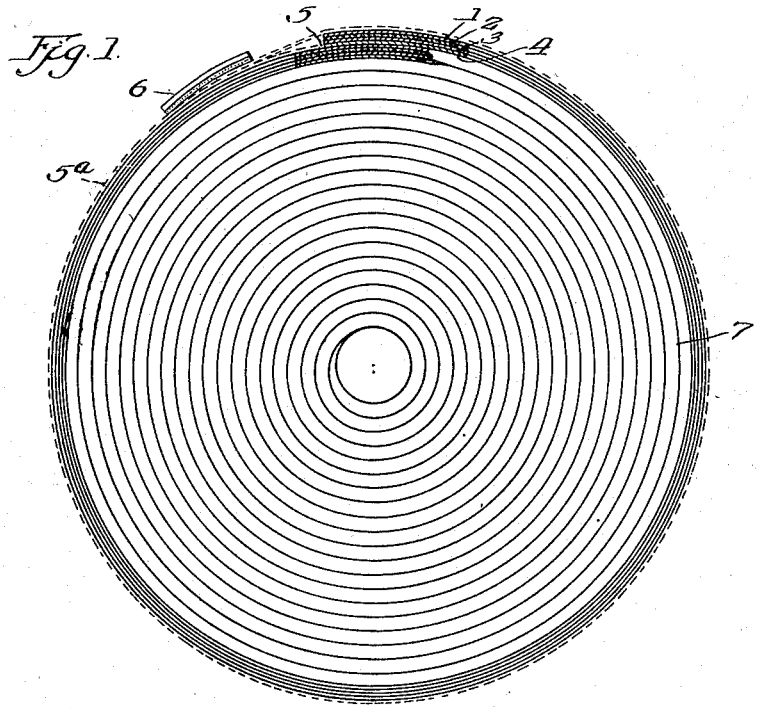
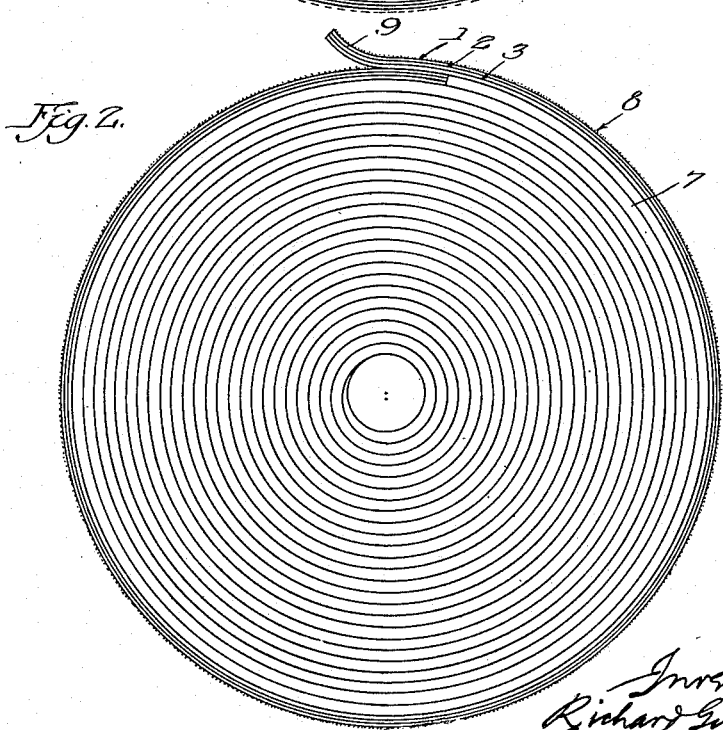

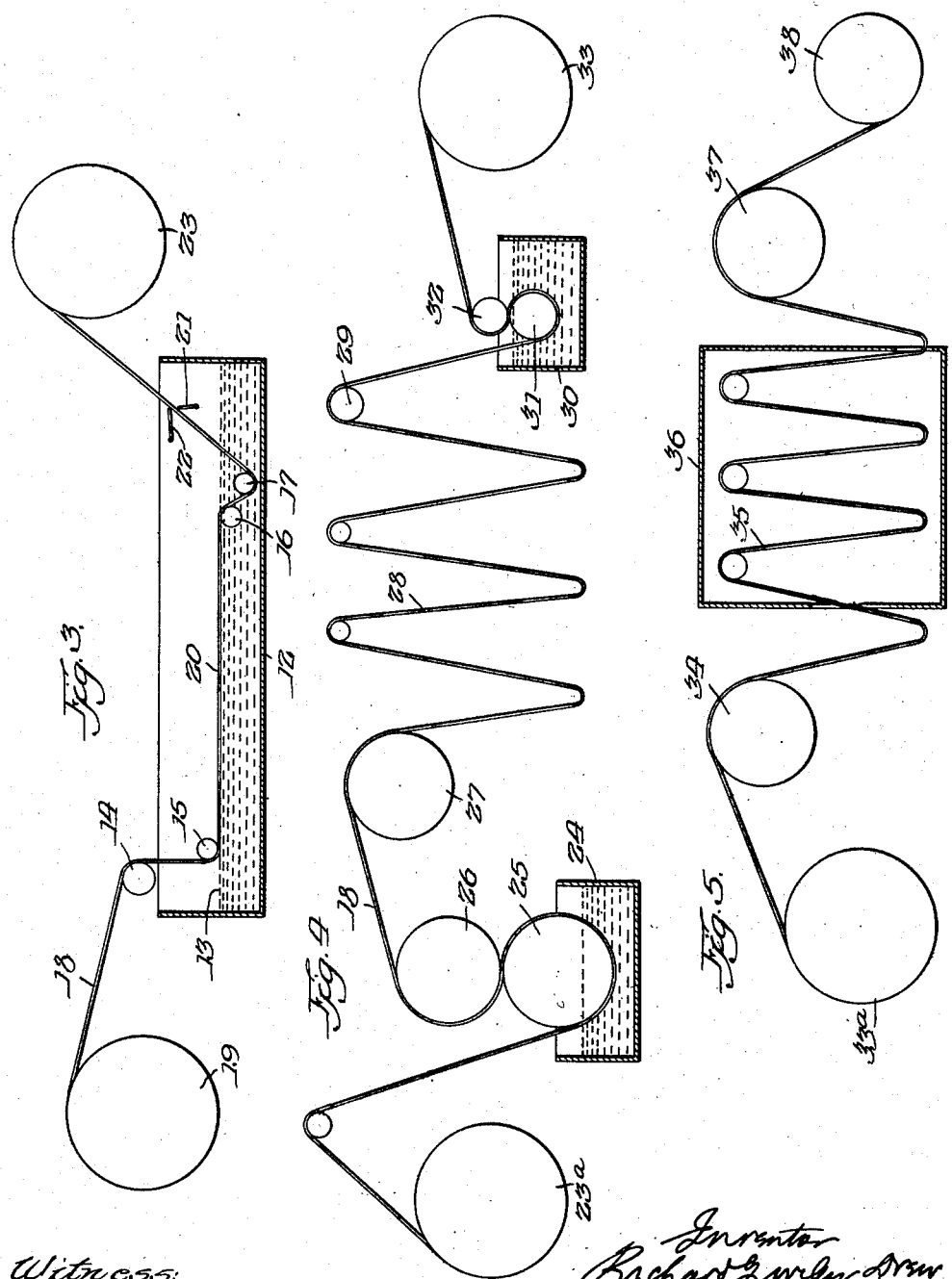

Patented Aug. 5, 1941

2,251,273

UNITED STATES PATENT OFFICE 2,251,273

ADHESIVE SHEET AND METHOD OF MAKING THE SAME

Richard Gurley Drew, St. Paul, Minn., assignor to Minnesota Mining & Manufacturing Company, St. Paul, Minn., a corporation of Delaware Application March 9, 1933, Serial No. 660,167

4 Claims. (Cl. 91—68)

My invention relates in general to adhesives or adhesive sheets; more particularly, to paper adhesive tapes carrying a layer or coating of adhesive which is normally tacky and pressure sensitive; still more particularly, to methods of making the same.

In my prior applications, particularly Serial No. 281,104, now Patent No. 1,760,820, and Serial No. 182,893, filed April 11, 1927, I have described and claimed certain adhesive tapes and adhesives in the form of sheets or the like and methods of making the same. The invention of said applications had preferred utility in producing an adhesive article for limiting the application of spray of liquid finishing material, such as, for example, lacquers or painting materials used in operations in automobile paint jobs, for masking during such operations or for holding masks in such painting operations.

My present invention is for an extension of said applications and for certain improvements thereon, besides other novel phases of said inventions as may appear to be hereinafter pointed out.

While my prior applications have the novel characteristics and utility pointed out therein for the purpose of producing an adhesive article using a cellulosic backing material, such as paper, or for producing a strip of adhesive for use as a masking strip or for holding a mask in position, where it is used in certain automobile finishing operations or for the production of an adhesive article in the form of rolls or stacked sheets, I have found that this material, particularly when prepared for use in localities having a wide range of atmospheric conditions, requires an undue amount of attention and variation in preparation to meet these various conditions.

Such embodiments of my prior application which contemplate the use of a unified backing material employing a water soluble unifying agent are particularly susceptible to conditions of humidity and temperature existing in various localities or at different times of the year in such localities, and while it was originally contemplated by me to make such changes in the unifying ingredient constituting a water soluble agent, such as glue, to meet such varying requirements, the exercise of care and attention to meet these varying conditions involves an element of cost which, in large scale production, is material.

While the problems above enumerated are not particularly present in using dense backing materials, particularly described in my application Serial No. 281,104, now Patent No. 1,760,820, particularly where I specify parchmentized paper, they do, to a limited extent, extend to the use with a backing material of the less costly character, such as porous paper, particularly where this backing material is unified with a water soluble glue base material of a hygroscopic agent augmented to a considerable extent by additional moisture retaining agents, such as glycerine or calcium chloride. This type of backing material, when so prepared, or the denser character of backing material, utilizing parchmentized paper, or material simulating the same, have certain additional objectionable qualities by reason of the fact that when they are used for automobile finishing operations, for masking purposes and such other operations referred to in my prior applications for limiting the application of coatings of paint, lacquer or the like, in that they do not expose the surface, having the same anchoring ability for this paint or lacquer and tend to produce what is known in this art as "lacquer sagging" or a "running" of the paint or lacquer, leaving unsightly edges.

Also, in my prior applications, where I have described certain unifying processes and resulting unified backing material for the adhesives in which the backing material involved paper, particularly of the toweled or creped variety, and the unifying composition was of the water soluble type, particularly employing a glue or glue-glycerine base material, in the process of unifying the backing material, a considerable "initial stretch" of the backing material is altered and lost. This is particularly noticeable with the cheaper grades of the unsized, uncalendered type of paper, or the creped or toweled variety of such paper, which had been so creped or toweled or formed with rugosities before being submitted to the unifying process.

It is therefore an object of my present invention to provide an adhesive article of the character referred to in my prior applications but to effect certain economies in its production by eliminating the cost incident to the care exercised in producing an article to suit varying conditions of humidity and temperature which may be experienced in different localities and during different seasons of the year; to provide an adhesive tape which has prolonged keeping qualities in storage and which is not susceptible to atmospheric conditions, such as humidity and temperature; to provide an adhesive article, particularly useful in masking operations for painting and spraying, which provides a backing surface which is free from the quality of sagging of the paint or lacquer applied thereto and avoids the possibility of running of the paint or lacquer, to thereby obtain a clean and proper edge in two color painting or lacquering operations.

It is a further object of my invention to provide an adhesive article in the nature of a normally tacky or pressure sensitive adhesive tape employing a backing material of paper, in which the full initial stretch of the backing material is preserved and the final article has the desirable qualities of my prior inventions, as particularly outlined in my application Serial No. 281,104, now Patent No. 1,760,820, in that the backing material is unified and when used with a normally tacky or pressure sensitive adhesive layer, provides a unified article free from any tendency to split or laminate when applied to the job for its intended purpose or when formed into stacks or rolls, for marketing the same; and further providing an article in which the backing materials that may be used are of the lower grades of unsized, uncalendered porous paper or the type which is of the previously toweled or creped variety, particularly that type which may be termed a "free" sheet.

It is a further object of my invention to provide in an adhesive article, such as an adhesive tape, which when it is applied as a mask, or for holding a mask in painting or lacquering operations, has unified characteristics and is impermeable to the solvents used in paints or lacquers and presents a back surface which will receive and hold the paint or spray of paint and lacquer and anchor the same without running; the provision of an adhesive article which is impermeable to the solvent used in paints or lacquers in painting or spraying operations, avoiding dislodgment or separation of the adhesive layer, but retaining the same on the back surface against any tendency to have the lacquer or paint sag or run, characterized by its porosity and thereby assure an even and smooth edge, inherent in using an unwoven backing material, such as a cellulosic backing material comprising paper.

It is still further contemplated as an object of my invention to provide an adhesive article including the preparation of a backing therefor comprising fibrous cellulosic material, such as paper, and unify the backing material, the unifying process including an agent which will not modify the hydrated fibres as they may be obtained from the paper making process, whereby the initial stretch of the paper as obtained from the mill will be retained, to the maximum degree, such process being characteribed by the impregnation, coating or surface treatment of the paper to unify the same, without any solvent action upon the size or the natural hydrated cellulosic component thereof which, when otherwise disturbed, would tend to reduce the stretch of the paper.

It is further contemplated as an object of my invention to provide a process for making an adhesive article and preparing a backing material useful in such article, which unifies the fibres of the paper, renders the same impermeable to the solvents used in painting and lacquering operations, provides an exposed back surface for the backing material, which anchors the paint and avoids running thereof and further provides a process and resulting article which does not require the exercise of undue care in its production for varying atmospheric conditions, such as humidity and temperature which may be experienced in different localities and during different times of the year.

In the production of an article as contemplated by me, preliminarily to applying to the adhesive article a water insoluble, normally tacky and pressure sensitive and unified adhesive layer, a water soluble adhesive layer, a heat activated adhesive layer or a water insoluble adhesive layer which may be otherwise activated to adhesiveness by the application of an organic solvent, as described in my prior applications, I subject the backing to a unifying process including reagents and ingredients having the properties of being inactive to changes in atmospheric conditions, particularly the property of being non-hydroscopic or of low hygroscopic qualities.

In the practice of my invention, cellulosic backing materials of the character referred to in my prior applications S. N. 182,893 and 281,104, now Patent No. 1,760,820 may be treated. Preferably, however, for economic reasons, I prefer to treat cellulosic fibrous materials, such as entering into paper making processes, tending to produce a normally porous, unsized variety of paper and preferably utilizing paper already prepared and which is absorbent, unsized, uncalendered; further, that which may be formed with rugosities by toweling or crinkling the same. The treatment of these cellulosic fibrous materials, however, may be in the paper making process, in accordance with the process which will be hereinafter described.

In the treatment of the preferred form of backing material in accordance with the above described forms, the unifying process includes a reagent which has the proper bonding power for the individual cellulosic fibres, to unify and unite the paper against splitting or any tendency to laminate when in use.

The reagents or ingredients contemplated by me for accomplishing the aforementioned purposes, avoiding certain of the objections noted in using a glue base or water soluble base material for unifying the backing material, may be as follows:

A. Water insoluble waterproofing ingredients, dissolved in an organic solvent;

B. Dispersions in an aqueous medium of water insoluble, waterproofing or non-hygroscopic agents;

C. Combinations of the aforementioned ingredients which may comprise water soluble ingredients dispersed in a solution of water insoluble bonding agent in an organiv solvent, in which the solution of the water insoluble ingredients in the organic solvent forms the continuous phase;

D. Materials of low hygroscopic qualities or waterproofing and water insoluble properties whose physical construction leaves a coating on the backing material, compatible with solutions of paints or lacquers to anchor the same and to prevent running.

Of the water insoluble ingredients which may be used, resin or rubber base materials are contemplated by me.

Of the resinous materials which may be used, the natural resins may be used or the artificial resins, such as phenolic condensation resins, phthalic anhydride resins and other equivalent condensation or polymerized resinous products which may generally be referred to as artificial resins or resin substitutes.

The rubber base materials may include the purer grades of rubber, such as latex crepe or smoked sheet rubber, reclaimed rubber, dispersions of rubber, such as latex, or dispersions of vulcanized rubber including reclaimed rubber.

In the consideration of the method of preparing the adhesive article in the form of tape and particularly that phase of the process which contemplates preliminarily forming the backing material, including porous, unsized and uncalendered paper, particularly that formed with rugosities by toweling or crepeing the same, the backing material to be used with a surface coating of a normally tacky and pressure sensitive adhesive, the problem involves adequate bonding of the fibres to overcome any tendency to laminate when used on the job for its intended purpose, or when in the marketable form, in the form of stacks or rolls, thereby unifying the fibres and offering the adequate resistance of the individual fibres themselves to pull apart readily. However, this impregnation or surface coating of the fibres should be without excess, to thereby offer a back surface of the least amount of resistance to energy by the adhesive surface used, such as the normally tacky and pressure sensitive adhesive coating, where this form of adhesive is preferred. The backing requires that the surface to be coated with the adhesive material be compatible with the energy of the adhesive layer during the coating operation, to unite itself to the backing material and after the coating operation is completed, to minimize any tendency of the normally tacky or pressure sensitive adhesive to become united to the uncoated paper surface, where this form of adhesive is used. The problem further involves the use of an impregnating or coating material which will give to the composite article the proper distensibility and flexibility, particularly when using paper stock formed with rugosities, as by toweling or crepeing the same, rather than the flat, unmodified paper or backing material.

In achieving the characteristics aforementioned in an adhesive article, while the rosin or resin base materials have, to a certain extent these desirable characteristics, in that they have sufficient bonding power to unify and reinforce the backing material, particularly paper, as it is desirable to augment the flexibility of the backing material thus treated with these resinous materials and further, to augment the unifying of the rubber base adhesive material, when this is used, to the backing material, it is contemplated by me to include with the rosin or resinous materials, an ingredient which plasticizes the resinous or rosin materials and overcomes the tendency of the resinous material or the rosin to become embrittled, particularly under atmospheric conditions including lower temperatures. While rubber itself may be substituted in whole for the resinous or rosin material, solutions of rubber in their solvents have low penetration properties for the backing material. It is therefore contemplated by me to reduce the viscosity of the rubber solutions and obtain better penetration by combining with the rubber solutions the naturally resinous or artificially resinous materials or any using rubber base materials, per se, for the fluidity augmenting agent characterized by using rosins therewith, by forming the rubber in a dispersion. The combined effects, so far as bonding powers, flexibility, distensibility and freedom from any tendency to become embrittled, and also the proper physical properties in the end product, to offer the least amount of energy for the normally tacky or pressure sensitive adhesive coating, where this is used, may be augmented by including in dispersions of rubber, where these are used, quantities of the natural resinous materials or artificial resins. While it is contemplated by me to use natural aqueous dispersions of rubber in that the rubber in this form has the quality of coalescing, this property may be augmented, particularly when using dispersions resulting in vulcanized or modified rubber, by including therewith either the natural resinous materials or artificial resinous materials.

Though it is contemplated by me to overcome any tendency of the resinous materials to become embrittled and impart the requisite flexibility to the fibrous unifying, impregnating or surfacing material by the inclusion of a rubber base component, or to increase the coalescing property and fluidity of the rubber base material by adding thereto a resinous material, the unifying ingredient may be substituted, in whole or in part, by the addition of plasticizing agents which are normally fluid, such as vegetable oils, particularly those of the drying oil type, such as drying or semi-drying oils, such as linseed oil, tung oil or China-wood oil.

Of the class of materials previously enumerated for purposes of unifying the backing material in an adhesive article and comprising waterproofing, non-hygroscopic ingredients, in a vehicle which has the minimum tendency to reduce the amount of initial stretch of the backing material, and for purposes of accomplishing the desirable product previously referred to, rubber and rubber resin mixtures are used and these are preferably dissolved in a vehicle generally termed "organic solvent."

In the production of this type of fibre unifying, impregnating or surface treating material, the rubber constituent is preferably milled and to this is added the various resinous components, of which natural, synthetic or pine rosins may be enumerated. Though it is preferred to incorporate the rubber and rosin mixture by milling and then adding the predetermined quantity of vehicle in the nature of an organic solvent, direct solution of these ingredients in the organic solvent may be another suitable means of preparing the paper treating solution. A formula suitable for this purpose, is as follows:

I

| | Per cent |
|---|---|
| Latex crepe | 25 to 75 |
| Rosin | 75 to 25 |

The combined percentage of rubber (latex crepe) and rosin may constitute 20 to 40% and the organic solvent 80 to 60%. A preferred percentage is as follows:

II

| | Per cent |
|---|---|
| Rubber (latex crepe) | 10 |
| Rosin (wood rosin and pine rosin preferred, altough artificial resins may be used) | 20 |
| Organic solvent (preferably oleum spirits) | 70 |

With the formulae as above described, desirable unification of the paper or similar cellulosic backing material may be obtained, to result in an end product, so far as the backing material is concerned, having the desirable physical characteristics previously enumerated.

Unification of the backing material in accordance with the prior examples given and those which will be subsequently enumerated, including rubber, with or without a resinous material, may be more satisfactorily obtained by including the maximum amount of rubber for the purpose necessary in unifying by reducing the viscosity of the rubber material in the oleum spirits to the minimum. This I may accomplish by breaking down the nerve of the rubber before effecting solution with the organic solvent, such as the oleum spirits specified in my prior examples. This practice of breaking down the nerve to reduce the viscosity of the rubber solution to the minimum is found particularly desirable where latex crepe is used, and in the procedure preferred by me the rubber, particularly the latex crepe, is milled together with the filler that is utilized, such as zinc oxide or whiting, in equal parts thereof, the milling being done in five successive operations and being sufficient to break down the nerve of the rubber.

A variation may include a thirty minute milling, dry, in an internal mixer, with a lapse of twenty minutes before the addition of any solvent, and then the addition of the requisite amount of solvent. The resinous content, where this is used, as specified in the above examples or that indicated subsequently, is added at the early stages of the addition of the solvent. However, the rosin may be added during the milling operation.

The procedure above outlined, serving to break down the nerve of the rubber, results in a mixture in the solvent of greater penetrating qualities, or compared with the same viscosity, can carry a larger amount of rubber into the pores of the backing to be treated. Where the rosin is added during the milling operation, a more thorough dispersion of the resinous material into the rubber structure is effected and where the resin is used, especially with elevated temperatures approximating 200° F., a more thorough reaction of the resinous material with the ruber appears to take place, to further facilitate more rapid dissolution of the mixture in the volatile solvent, such as oleum spirits.

However, additional porosity of the back surface of the adhesive article prepared by me may be obtained and also added qualities to anchor the paint or lacquer and prevent running of the same by inclusion of inert filler materials, such as pulverized calcium carbonate, of which whiting may be given as an example. In the formulae above given about 3 to 8%, preferably 6%, of the inert filler may be included, based upon the total percentage of rubber-rosin and organic solvent. With an impregnating agent of this extreme fluidity, the soluble material is absorbed by the paper, leaving the inert material, to a certain extent, as a deposit on the back surface, to further augment the qualities of the back surface in its ability to anchor and prevent running of the paint or lacquer sprayed or otherwise applied thereto, for the purposes above enumerated. Additionally, also, the inclusion of the inert filler in quantities above enumerated appears to produce an impregnating solution of higher fluidity.

The property of increased fluidity appears to be more pronounced in using reclaimed rubber, particularly selected light inner tube reclaim, in addition to certain percentages of latex crepe rubber. A formula utilizing reclaimed rubber is as follows:

III

| | Per cent |
|---|---|
| Wood rosin | About 50 |
| Rubber (selected light inner tube reclaim) | About 32 |
| Inert filler (whiting) | About 14 |
| Rubber (latex crepe) | About 4 |

In this formula, the rubber, resin and solids may constitute 40%, as compared with 60% of the organic solvent, comprising oleum spirits, though a variation may be made, as follows:

IV

| | Per cent |
|---|---|
| Solids, constituting combined rosin, rubber and inert filler | 50 to 30 |
| to | |
| Oleum spirits | 50 to 70 |

In the above formula, the rubber to rosin relationship may be as in Formulae I and II previously given.

In the formulae above given, particularly that using latex crepe, the rubber constituent may be subsequently vulcanized by sulfur or sulfur compounds, accelerators or by vulcanizing using vapor curing, such as sulfur chloride compounds or similar chemicals. However, the vulcanizing constituent may be added directly to the impregnating solution and the paper then treated by a slight amount of heat or suitable aging to accomplish the vulcanizing effect.

An example of a formula suitable for this purpose is as follows:

V

| | Per cent |
|---|---|
| Rubber (latex crepe) | About 10 |
| Zinc oxide | About .5 |
| Sulfur | About .2 |
| Diphenyl guanidin (or similar accelerator) | About .1 |
| Rosin | About 20 |
| Oleum spirits | About 69.2 |

It will be understood that the rubber to rosin relationship may be varied in accordance with the relationship previously enumerated in Examples I, II and III and that these combined ingredients may be varied in relation to organic hydrocarbon solvent within similar ranges, with appropriate variation of the vulcanizing and accelerating agents, in accordance with the variation in the rubber constituent.

In the formulae previously enumerated, the vehicle has been referred to us as an organic solvent, particularly the hydrocarbon solvent. The solid constituents comprising the rubber or rubber-resin base materials may, however, be dispersed in aqueous mediums, such as water. Though the solid constituent may primarily be rubber, the inclusion of the resinous constituent is preferred for purposes previously enumerated and for additionally obtaining the desirable results, where dispersions of rubber are used. Though preponderating quantities of resinous material to rubber may be used, as in the formulae previously enumerated, using an organic solvent vehicle, in using dispersions of rubber in aqueous vehicles, such as water, it is preferred to diminish the content of resinous material to rubber and this may be varied, using .5 to .7 part of resinous material compared with the rubber constituent, preferably about .6 part.

A formula suitable for this purpose is as follows:

VI

| | Per cent |
|---|---|
| Rubber (inner tube reclaim) | 45 |
| Rubber (latex crepe) | 5 |
| Inert filler (whiting) | 20 |
| Resin (rosin) | 30 |

A small part of sodium hydroxide, such as .5% of the total quantity of solid constituents above enumerated may be added. The dispersion agent may be water, and the solid constituents dispersed in this aqueous vehicle may simulate natural rubber latex, so as to constitute about 30% solids, dispersed in an aqueous vehicle. However, the solid constituents may be reduced to obtain greater fluidity and greater impregnation or a more plastic mass may be made by increasing the solid constituents and thus the solid constituents may constitute from 20 to 50% of the aqueous dispersion, in which water is the dispersing agent and constitutes the remainder of the 100%.

The inclusion of the sodium hydroxide acts as a dispersion agent, particularly when this is combined with the rosin to form a soap. However, other dispersing agents may be used.

Latex, as directly obtained, including 25 to 35% of solids, may be used and this may be preserved by the addition of 1 to 5% of ammonia, to prevent undue separation of the rubber constituents. However, other dispersing agents may be used and concentrated latex may be obtained and thinned to the desired consistency for impregnation or for the paper treating process.

In the formulae above described, I have referred to a rubber-rosin base material in an organic or hydrocarbon compound vehicle, such as oleum spirits, in which vulcanizing agents are included. Where I propose to use dispersed rubber, such as latex or reclaim, I may also use, with considerable success, aqueous dispersions of rubber in which the rubber has been vulcanized in the dispersed condition, in its aqueous vehicle, using the product known as Vultex, made by adding to a thin solution of latex, containing ammonia, in which the rubber content is about 30%, 3% by weight of sulfur and small quantities of zinc oxide and piperidine. The solution so prepared is placed in a vulcanizer and heated under forty pounds pressure for about one half hour. The solution may be directly used for treating the backing material of cellulosic material, such as paper, as contemplated by me. Preferably, however, it includes .4 to .6 part of the rubber solids of a resinous content. The inclusion of the resinous content facilitates the unifying of the fibrous material and the treatment of this backing material. Without the use of the resinous material, coagulation of the rubber upon the fibres will occur, making necessary a treatment with a certain amount of heat, of the paper which has been thus impregnated. This, however, is at the sacrifice, to a certain extent, of the porous characteristics of the product, as indicated desirable for purposes contemplated by me in making an adhesive article for masking purposes in painting or spraying operations.

An example of this type of product is as follows:

VII

| | Per cent |
|---|---|
| Glycerol phthalic anhydride condensation resin | About 70 |
| Oleum spirits or xylol | About 30 |

The resin above referred to is made from condensing or polymerizing compounds of the class of phthalic anhydride and glycerine, preferably carrying out the process in the presence of, or by the addition of linseed oil, with condensing agents such as acids. The resinous product and mixture with the linseed oil is dissolved in a volatile solvent which is a hydrocarbon compound, as above enumerated. A phthalic anhydride resinous material which may be used by me is one found on the market and known as BB6468, Du Lux Resin.

A further example of a formula for forming a non-hygroscopic backing material, serving to unify the cellulosic backing material, such as paper, for my purposes, and made from drying oils, modified to obtain proper unification of the fibres with the desirable properties of porosity for anchoring a solution of paint or spray of lacquer, when the article is used in masking operations, and which has, to a certain extent the freedom of varying under changes in atmospheric conditions, such as humidity and temperature, to a certain extent found to be objectionable in my glue base backing material, is as follows:

VIII

| | Per cent |
|---|---|
| Linseed oil, thickened or bodied by boiling | 80 |
| Oleum spirits | 17 |
| Cobalt acetate | 3 |

A variation of the above ingredients may be as follows:

IX

| | Per cent |
|---|---|
| Linseed oil | 75 to 85 |
| Oleum spirits | 23 to 11 |
| Cobalt acetate | 2 to 4 |

Other drying or semi-drying oils may be used, such as Chinese Wood oil or tung oil.

After impregnation or coating with a solution of this material, the backing material is air dried to insure oxidation of the drying oil, and to assure the maximum keeping qualities of the backing material so prepared against any tendency to harden or embrittle by aging. This may be assured, to a certain extent, by the inclusion of artificial stable resinous materials which are not modified materially in aging, and may include a co-polymerization of the artificial resins with the drying oil, before it is bodied and boiled for purposes of use by me.

The treatment of the fibrous backing, as contemplated by me, need not be confined to a single treatment and may include a preliminary treatment with the weaker concentrations in the vehicles of the water insoluble ingredients and then a further treatment of the same ingredients in higher concentrations of the solids in the vehicles. Such treatment, I have found, assures a proper unifying of the fibres and prevents a scuffing of the superficial portions of the backing material.

The reagents in accordance with the examples previously given, may further be utilized to reduce the susceptibility of the backing material and the adhesive article made in accordance with my prior inventions, described in applications heretofore mentioned, to variations in atmospheric conditions, by the inclusion of material percentages of these organic, water insoluble bonding agents with the glue base or glue-glycerine base unifying compositions disclosed in my prior application and patent. This I have found particularly valuable in using a water soluble adhesive layer and is also desirable where it is found expedient to include the moisture retaining properties of the adhesive article in the backing material as made in accordance with my prior examples.

For this last mentioned purpose, particularly where using normally tacky, pressure sensitive adhesive layer of the rubber base type, referred to in my prior applications, Serial No. 182,893, and 281,104, now Patent No. 1,760,820, the glue base unifying composition may have added thereto substantially equal parts of the water insoluble fibrous treating compositions of the rubber base type or rubber-resinous base type or resinous type hereinbefore specifically enumerated. It is preferred, under such conditions, to make a dispersion of this glue base material, where an organic hydrocarbon solvent is used, with the solution of the fibre treating composition in the organic solvent, in the continuous phase.

The cellulosic backing material, such as paper, treated in accordance with this formula, has some of the desirable qualities of my adhesive article, referred to in my prior applications in that the article so made may be readily separated from stacks or rolls but has the additional advantage that the material so made has reduced hygroscopic qualities but increased ability to prevent lacquer sagging or running of the paint which may be applied thereto when the adhesive article is used in painting and spraying operations.

It will therefore be apparent that I do not consider to confine myself to a treatment of the raw backing fibrous material with a single solution or dispersion of the water insoluble rubber, or rubber-resin compositions previously enumerated, and that the same applies where the backing material is first treated with a dilute solution of the formula given and then with a further, more saturated solution which may be in the nature of a coating, after the backing material has been first treated with a more dilute solution. Thus the backing material may be treated with a different solution, in the nature of a sizing coat.

Where a particularly energetic, normally tacky and pressure sensitive adhesive coating of the rubber base type is used in the adhesive layer, the back sizing may include a treatment with a thin solution of shellac, to wit, a solution of lac in an alcoholic solvent. The solution of shellac for this purpose is preferably a 50% solution of shellac. Where such additional surface treatment with a solution of shellac is employed, it has been found particularly desirable to include an inert filler in the nature of pigment in the initial paper treating solution of the character heretofore exemplified. This inert filler or pigment content develops a film on the backing material treated, preventing the solution of shellac from striking into the paper itself, and avoids any tendency to modify its flexibility.

While I have previously indicated the nature of the paper, where this is used, in its preferred form as being a highly porous, uncalendered paper of the character designated in my prior applications, which is suitable in all respects, particularly where using dispersions of the ingredients in aqueous vehicles, in the examples above enumerated, using an organic solvent, it is preferred by me to use a sheet of paper of a character which is extremely porous and which may be termed a "free" sheet, carrying no appreciable amount of size. The tensile strength of the product may be increased by reducing the porosity of the paper, obtaining a lesser amount of penetration toward the center of the backing and leaving a larger percentage of the residuum on the surface of the backing material itself.

In general, the treatment with the ingredients enumerated by me are such that impregnation is made without any excess or without any deficiency which would otherwise tend to avoid unification of the fibres. The quantity of residuum retained in the backing material is preferably about 1.27 parts of the solid constituents to one part of paper by weight.

In the preparation of the backing material as contemplated by me, particularly that employing a vehicle or solvent for dispersing or dissolving the rubber or rubber-resin compounds, the hydrocarbon solvent employed should be one which reduces the residual tackiness of the solid materials to the minimum, after the solvents have been driven off, and this I have found I can accomplish by using a solvent carrying appreciable percentages of the high boiling point fractions and oleum spirits, as designated by me, is preferred for this purpose. Such solvent, I have found, produces the requisite saturation of the paper, after passing through a saturating tank and being festooned on racks to separate the volatile solvent or a volatile vehicle.

Backing material as prepared by me in accordance with the heretofore described formulae is otherwise completed into a final adhesive article by coating the same with a layer of the adhesive material and where the normally tacky or pressure sensitive adhesive layer of the rubber-resin-zinc oxide base type, referred to by me in my prior application Serial No. 281,104 now Patent No. 1,760,820, is used a priming coat of the character therein referred to may, to a certain extent, be eliminated with this type of adhesive. Thus I may, upon treatment of the backing material in accordance with the formulae above enumerated and by the process therein set forth, immediately and without the necessity of applying a priming coat, directly surface coat the backing material with the layer of normally tacky, pressure sensitive material of the rubber-resin-zinc oxide type disclosed in my prior application.

Though any of the formulae above described may be used for coating, impregnating or otherwise surface treating previously prepared paper, they may be used by adding these constituents directly to the paper mill beaters and while this type of material is suitable, to a certain extent, for my purpose, particularly when using a normally tacky, pressure sensitive adhesive material of the water insoluble character, of which rubber is a constituent, it is not as desirable as the treatment whereby these compositions are used to treat previously prepared paper, in that it may be desirable to surface treat the paper on one side only or use the backing material with adhesive layers other than those of the water insoluble character, which adhesive layers may not be compatible. Such addition of these ingredients directly to the paper beater may also require a further treatment as an additional coating or surface treatment of the impregnating solution, which quantity it may be difficult to add initially directly to the paper beater.

Though I have previously indicated as desirable to prepare a backing material suitable for use as a mask in painting or lacquering operations, by including in the article made a backing material which has a surface application compatible with paints or lacquers directly with the paper backing of the water insoluble character, I do not intend to confine myself to this treatment. A backing material which exhibits a surface compatible with paints and lacquers to anchor the same against running may be obtained with a somewhat porous unified backing material, or one which is made in accordance with my prior applications, and particularly described in my prior application, Serial No. 281,104, now Patent No. 1,760,820, including paper treated with a glue base material, preferably glue-glycerine base material.

I have therefore found that I can utilize the glue-base or glue-glycerine base material described in my prior application aforementioned, and obtain a backing which is compatible with paints or lacquers to anchor the same against sagging or running by applying to said glue-glycerine base material a thin coating of shellac, as previously mentioned, or a thin back sizing of a lacquer of the cellulosic compound type, such as a plasticized solution of nitro-cellulose or cellulose acetate, or similar cellulosic compounds. This back sizing not only is compatible with paints or lacquers to anchor the same against running but in stacking or winding tapes having this back sizing and having on the opposite surface an adhesive layer of normally tacky, pressure sensitive material, particularly of the rubber base type, removal from stacks or unwinding may be done with equal facility to the article described. This type of article, and that of the character including treatment by a water insoluble material, above described, are of particular value in connection with painting or lacquering operations which may include baking operations, in that any tendency to shrink or curl away from the surface to which it is applied is materially reduced. While in the case of the glue-glycerine backing material of my prior applications, this tendency may be overcome to a material extent by increasing the glycerine and moisture content, by the use of the backing material including the water insoluble treatment, the tendency to shrink or curl away from the work is still more materially reduced than in the modification by the inclusion of a higher content of moisture and glycerine, and in the example aforementioned, including as a back sizing for the glue-glycerine base backing a sizing of shellac or other material compatible with paints or lacquers, I need not include such a high content of moisture or glycerine and in addition to providing the backing material with a sizing which is compatible with paints or lacquers to anchor the same, the tendency of a glue or glue-glycerine treated backing material to shrink or curl is also materially reduced by reason of this back size coating. This latter back sizing may, as in the prior examples given, be additionally augmented by the inclusion of a pigment within the percentage range, as noted in Example 6. Any amount of filler included within this back sizing will be effective for the purposes indicated in proportion to its addition, and the particular preferred percentage mentioned is not to be interpreted as a limitation.

The treatment herein described for unifying the backing material where porous paper is used, is superior to the adhesive article made in my prior mentioned application, in that it is not susceptible to variations in humidity and atmospheric temperature experienced in storage and, further, the unwinding when ready for use may be accomplished with greater facility and speed in that the adhesive layer is not as energetic in its adhesion upon the back surface, when stacked or wound into rolls.

I may additionally facilitate the speed with which the initial layer of tape is separated or unwound from stacks or rolls, by the following procedure and for this purpose I make reference to the accompanying drawings, forming a part hereof, in which—

Figure 1 is a roll of adhesive tape made in accordance with my invention;

Figure 2 is another embodiment thereof.

Figures 3, 4 and 5 are schematic views of apparatus for carrying out the method of paper treatment of this invention.

Referring to the drawings, I have described a roll made in accordance with the embodiment herein described comprising a backing material 1, a layer of adhesive 2, united to the backing material, and a back sizing or coating 3, where this is found desirable. The tape so prepared is preferably wound into rolls so that the unified backing material exposes a surface in connection with the composite formed by the backing material 1 and the adhesive layer 2, so that the unified back surface is always interposed between and in direct contact with layers of the adhesive. The tape is rolled for the full length until the length necessary for the last convolution is reached, at which point there is wound into the roll a slip sheeting 4. This slip sheeting may be made of glassine paper, parchmentized paper. Preferably, however, a sheet of regenerated cellulose of the character known on the market as Cellophane is used. The Cellophane may be one which includes a waterproofing film on both sides, made from some waterproofing material, preferably plasticized nitro-cellulose.

The length of slip sheeting may be continued for an additional turn and the end 5 thereof sealed by a piece of tape to hold the roll from unwinding. The package so prepared may be used for starting the unwinding operation for its use, with greater facility and speed in that the adhesive layer 2 does not adhere so energetically to the layer of slip sheeting 4 provided.

The package so prepared further is desirable in that changes in humidity and temperature which causes, perhaps, a transferring of the adhesive to the back surface does so to the convolution including the slip sheeting less energetically and thereby facilitates quick unwinding of the roll of the tape the first time it is used. Thus, by the package as provided, the tape may undergo the worst conditions experienced in storage and will be ready for use when it is desired to begin the unwinding of the tape, with maximum speed and facility.

As another embodiment of my invention for making a package of tape as above described, I may, upon completion of the winding of a roll of tape 7, spray over the outer surfaces a waterproofing material, such as a spray of pyroxylyn lacquer 8, preferably leaving an upturned tab 9. The waterproofing lacquer chosen is one which will leave a hard, inflexible film of brittle character which tears easily, and is obtained by including the minimum amount of plasticizing agent in the lacquer of nitro-cellulose. The package as thus described will resist variations experienced in storage by acting as an efficient seal against changes in humidity and temperature and will, upon beginning the unwinding of the roll, facilitate this action in that the adhesive layer will not become too energetically adherent to the back surface of the tape.

It will be observed that though it is preferred by me to prepare a package including the tape with a normally tacky, pressure sensitive and adhesive material upon a backing particularly prepared in accordance with this application, the package as herein prepared may be used with a tape as prepared in my prior applications, including that wherein the backing material is unified by a glue base material, such as a glue-glycerine solution.

It will be understood that for certain purposes of treatment of the paper preparatory to receiving the pressure sensitive adhesive of this invention, the process may be carried out by saturating a raw paper of the porous type with a glue-glycerine solution, then festooning the same and then applying the formaldehyde treatment whereupon the paper may be oven dried.

A preferred treatment of the paper preparatory to receiving the pressure sensitive adhesive, is to float the raw paper on a saturating solution, then giving a second application of the solution by immersion, then festooning the sheet, then applying a formaldehyde solution or tanning and later introducing the paper into a drying oven.

An apparatus for carrying out the last mentioned method is illustrated in Figures 3, 4 and 5, and referring first to Figure 3, I provide a tank 12, containing a saturating solution to a depth approximately that indicated at 13.

For my purpose I have preferred to employ a tank in excess of 10 feet in length, that is to say, of sufficient length to give the flight of paper a length of ten feet of contact or flotation on the saturating solution, said tank being provided with suitable guiding rolls 14, 15, 16 and 17, the paper web 18 being supplied from a roll 19 of raw paper and being trained over the roller 14 and under the roller 15, suitable tension being maintained on the horizontal flight 20 so that the same substantially floats for approximately 10 feet of its length on the surface of the saturating solution, the upper surface of the flight 20 being during the floating of the paper web, maintained free of saturating solution.

At the end of the ten feet of floating treatment the web of paper is trained over the roller 16 and under the roller 17, so that the paper is given what may be termed a "quick dip" at this point, whereupon it is drawn from the tank past scraper guides 21 and 22 contacting each side of the paper web, the web being then wound up on a winding shaft into what I term "the wet roll form" indicated at 23.

The scraper knives bearing on the opposite sides of the freshly dipped paper serve to adjust the surface excess of coating solution going into the wet roll wind-up. The saturated paper is allowed to remain in the wet roll form for approximately 15 minutes so as to permit the solution to become evenly distributed through the sheet.

One of the advantages of the flotation step of this method resides in the fact that the saturating solution is absorbed during the floating period from only one side of the paper, the solution reaching the other side by capillary or wick action. This furnishes an opportunity for the air contained in the porous paper to escape freely as the solution is absorbed evenly through the sheet. Former methods of saturating which employ complete immersion of the paper at the outset are not as effective in obtaining a high degree of saturation due to the air which is entrapped in the pores of the paper and which limits the degree of penetration of the solution particularly in the center portion of the sheet. The difficulty frequently termed "starving" of the center of the sheet, is overcome by the floatation method shown in Figure 3.

The purpose of dipping the sheet at the end of the flotation step is to compensate for any lack of proper saturation by capillary action of the upper surface of the sheet by the time it reaches roller 16. The quick slip at roller 17 coats the upper surface of the sheet and the scrapers 21 and 22 are adjusted so as to leave some excess of the solution on the surfaces of the sheet as it goes into the wet roll 23. The time during which the sheet so prepared is kept in the wet roll form may be varied according to the requirements of the particular paper or saturating solution used, but I have found that for my purposes fifteen minutes in the wet roll form is sufficient time to permit the solution to become evenly distributed through the sheet.

The time during which the sheet is in contact with the saturating solution in the flotation process may be termed the floating period. This is controlled by the length of the tank and the speed with which the sheet is passed through the system. For example, a speed of 40 yards per minute passing through a ten foot tank gives a floating period of 5 seconds.

Longer floating periods whether produced by increasing the length of the tank or running the sheet at reduced speed result in increased absorption of the solution by the sheet up to the point of complete saturation.

The amount of solid matter deposited in a porous sheet by such a saturation method depends upon the concentration of the solution and upon the degree to which the sheet is saturated by the solution. I have in actual experiment determined that for a given solution the flotation method described herein produces a more even distribution of the solid matter added to the paper and a greater increase in the weight of the treated sheet than any of the prior methods known to me.

I desire it to be understood that the advantages of this method are not so much a matter of the time of contact with the solution in the floating process, but are derived more from the step of floating per se, because of the free expulsion of air from the interstices of the paper and the consequent increase in solid matter added evenly to the web or paper.

The saturating operation and the degree of saturation of the paper is controlled by a wet weight which is the sum of the raw paper plus the saturating solution take-up, covering, for example, a 4 by 6 inch area.

The raw paper weight in such cases would be approximately 15 grains per 4 by 6 inch area, and in prior methods of treating the paper the wet weight ranged from 35 to 45 grains, indicating that 20 to 30 grains of actual saturating solution was imparted to the paper. The 45 grains wet weight being standard, prior to the present method, actually represented 9.9 grains of solid glue-glycerine remaining in the 4 x 6 inch area of paper after complete water loss. With the method of this invention, the wet weight averages close to 50 grains which leaves approximately 11.6 grains of solid glue-glycerine in the same area of 4 by 6 inches. This represents about 0.77 part of dry glue-glycerine to one part of paper by weight, disregarding the amount of water which would be normally retained by the glue-glycerine in the marketed article.

In both the prior methods and in the present method the raw paper weighs 15 grains per 4 by 6 inches and the saturating solution used in both instances was one part of glue, two parts of glycerine and six parts of water.

It is to be understood that there is an advantage in the present method of this invention in that a higher wet weight per 4 by 6 inches is obtained, but the important advantage is in the ability to get into the paper an increased solid content whether glue-glycerine or the other solids herein mentioned are employed thus getting the solids into the internal fibres of the paper rather than accumulating them on either surface of the paper stock.

After the paper is treated in the apparatus shown in Figure 3, it is allowed to stand in the wet roll form for 15 minutes; it is then run from the wet roll indicated at 23a in Figure 4 into a second saturating tank 24, wherein it passes under roller 25, around this roller and between it and the second squeeze roller 26. The paper web indicated at 18a is then run over a pull drum 27, and festooned as indicated at 28, whereupon it is trained over a roller 29, and then receives a bath of formaldehyde solution in a tank 30. The paper passes under a squeeze roller 31 and between this roller and a second squeeze roller 32, whence the paper proceeds to the formaldehyde wind-up roller indicated at 33. The paper is allowed to remain in the formaldehyde wind-up roll 33 for approximately three hours.

From the formaldehyde windup roll indicated at 33a in Figure 5, the paper is then run over a roller 34, festooned as at 35 in a suitable drying oven 36, and from this oven over a pull drum 37 to a roll 38. From the roll 38 the paper is later removed for receiving the pressure sensitive adhesive described herein.

It will be understood that the data as to time intervals, weights of paper, and results obtained therefrom are subject to variation and dependent upon the treatment desired. However, for the production of a satisfactory commercial product I have found that the paper forming the backing for an adhesive tape of the character described herein when treated in the manner described and illustrated in Figures 3, 4 and 5, imparts to the paper highly desirable characteristics so that it does not become affected materially by the solvents of paints and varnishes used in spray coating and the like.

Having thus described my invention and illustrated its use, what I claim as new and desire to secure by Letters Patent is:

1. In combination a base having a surface, a coating formed on a surface of the base comprising a major proportion of rosin and a minor proportion of a substance from the group consisting of rubber and a coating comprising dominatingly nitrocellulose superimposed on said first mentioned coating.

2. In combination a base having a surface, a coating formed on a surface of the base comprising rosin 75-25% and rubber 25-75% and a coating composition comprising dominatingly nitrocellulose superimposed on said first mentioned coating.

3. In combination a felted material forming a base, a coating formed on a surface of the base comprising a major proportion of rosin and a minor proportion of a substance from the group consisting of rubber and a coating comprising dominatingly nitrocellulose superimposed on said first mentioned coating.

4. In combination a paper forming a base, a coating formed on a surface of the base comprising a major proportion of rosin and a minor proportion of a substance from the group consisting of rubber and a coating comprising dominatingly nitrocellulose superimposed on said first mentioned coating.

RICHARD GURLEY DREW.